United States Patent Office 3,092,607

Patented June 4, 1963

3,092,607

TERNARY BLENDS OF POLYSTYRENE-POLYETHYLENE-CHLOROSULFONATED POLYETHYLENE AND PROCESSES FOR MAKING THE SAME

James A. Herbig and Ival O. Salyer, Dayton, Ohio, assignors to Monsanto Chemical Company, St. Louis, Mo., a corporation of Delaware No Drawing. Filed May 11, 1959, Ser. No. 812,130
12 Claims. (Cl. 260—45.5)

This invention relates to styrene polymers. In one aspect, this invention relates to styrene polymer compositions comprising ternary blends of styrene polymer-ethylene polymer-chlorosulfonated ethylene polymer. In another aspect, this invention relates to methods for making ternary blends of styrene polymer, ethylene polymer and chlorosulfonated ethylene polymer.

The many valuable properties of polystyrene resins are well known so that this polymer has become one of our most important plastics of commerce. Unfortunately, polystyrene as ordinarily formulated is characterized by low impact strength, low flexural deflection, and low tensile elongation. Thus, polystyrene cannot be used for many potential applications where particular toughness is required.

It has been proposed to improve the physical properties of polystyrene by incorporating therein other polymeric materials. For example, as disclosed in U.S. 2,834,746 (1958), the impact strength, flexural deflection, and tensile elongation of styrene polymers can be improved by blending polyethylene with the polystyrene and incorporating therewith a small amount of a high molecular weight oil. For many applications, it is desirable to further improve these physical properties of styrene polymers and, in addition, to improve other properties such as flexural strength and tensile strength.

It is also known, as disclosed in U.S. Patent 2,834,749 (1958), that the impact strength, tensile elongation, and flexural deflection of styrene polymers can be improved by forming a binary blend of styrene polymer and chlorosulfonated polyethylene using polymerization blending methods. Although the improvement in the physical properties of these binary blends is substantial when compared to the unblended polystyrene, it is desirable to further improve these and other properties of styrene polymers.

We have discovered that ternary blends of styrene polymer with polyethylene and chlorosulfonated polyethylene can be formed and that the resulting ternary blends have improved properties not possessed by either of the separate binary blends with styrene polymer.

An object of this invention is to provide improved styrene polymer compositions.

Another object of this invention is to provide ternary blend compositions of styrene polymers.

Another object of this invention is to provide methods for forming mechanical and polymerization ternary blends of styrene polymers having improved physical properties.

Another object of this invention is to improve the impact strength of mechanical blends of polystyrene-polyethylene.

Another object of this invention is to improve the tensile elongation of mechanical blends of polystyrene-polyethylene.

Another object of this invention is to improve the flexural strength of polymerization blends of polystyrene-polyethylene.

Another object of this invention is to improve the tensile strength of polymerization blends of polystyrene-polyethylene.

Another object of this invention is to improve the tensile elongation of polymerization blends of polystyrene-polyethylene.

Other aspects, objects and advantages of the invention are apparent from the consideration of the accompanying disclosure and the appended claims.

In accordance with this invention, improved styrene polymer compositions are made by incorporating small amounts of ethylene polymer and chlorosulfonated ethylene polymer in styrene polymer to form a ternary blend of the same. The novel ternary blends of this invention comprise a major proportion of styrene polymer and a minor proportion of both ethylene polymer and chlorosulfonated ethylene polymer. Ordinarily, the total amount of ethylene polymer plus chlorosulfonated ethylene polymer in the ternary blends of this invention comprise less than 30% by weight of the total composition. Preferably, the ternary blends of this invention comprise styrene polymer containing from 1 to 10% by weight of ethylene polymer and chlorosulfonated ethylene polymer, as combined addends. In compositions formed by mechanical mixing of these three polymers, the ratio between the amounts of ethylene polymer and chlorosulfonated ethylene polymer is not critical and an excess of either over the other can be used so long as the total amount is less than 30% by weight of the ternary composition. In compositions formed by polymerization methods, the ethylene polymer is preferably present in the ternary blend in an amount at least equal to, and more preferably in excess of, the amount of chlorosulfonated ethylene polymer present. The above stated proportions give preferred compositions; however, other compositions outside the stated proportions can also be formed with fewer improvements in physical properties and with improvements to a lesser degree than are obtained in the preferred compositions.

The ternary styrene polymer compositions of this invention can be prepared by either mechanical or polymerization methods or by combination of these two methods to produce blends having a high degree of homogeneity. Preferably, the ternary blends of this invention are prepared by mechanically blending the preformed polystyrene, polyethylene, and chlorosulfonated polyethylene on machines of the type normally used for mixing rubbers and plastics such as hot mill rolls, extruders, and Banbury mixers. Polymerization methods for preparing the ternary blends of this invention can also be used.

In these polymerization methods, both preformed polyethylene and preformed chlorosulfonated polyethylene are incorporated in the styrene monomer and the resulting material subjected to polymerization. For best results, this polymerization is carried to a high conversion, such as greater than 95% conversion to high molecular weight polystyrene, and at conditions also resulting in a polystyrene product having a molecular weight of 50,000 to 100,000 or higher, as determined by the Staudinger method from the specific viscosity of a very dilute solution of the polymer.

Combination polymerization/mechanical methods can also be used to form the ternary compositions of this invention. Thus, either the preformed polyethylene or the preformed chlorosulfonated polyethylene can be incorporated in the styrene monomer, which is than subjected to polymerization, and the remaining polymer incorporated with the polymer thus formed by mechanically admixing therewith.

The foregoing procedures are given by way of example and various combinations of the same, or other procedures, can be employed to form a ternary blend containing largely polystyrene but relatively small amounts of polyethylene and cholorsulfonated polyethylene. The different procedures discussed herein are not the full equivalents of each other, as will be apparent from a consideration of the data incorporated in this specification.

Thus, the ternary blends of this invention are preferably formed by mechanically admixing the preformed polymers because substantially greater improvements are realized in the products obtained. However, polymerization blends are also included within the scope of this invention. Thus, the term "blend" as used herein includes both mechanical blends and blends prepared by polymerizing styrene in the presence of either or both of the preformed addends.

The ethylene polymer incorporated in the ternary blends of this invention includes the normally solid high molecular weight polymers of ethylene well known to those skilled in the art. Such polymers usually have number average molecular weights of at least 6,000 and preferably for the practice of this invention have molecular weights about 15,000. Ethylene polymers suitable for use in this invention can be readily made by subjecting ethylene containing from about 10 to 200 p.p.m. oxygen to polymerization at very high pressures, for example, 20,000 to 40,000 p.s.i. There are other methods of preparing solid polyethylene, for instance, by employing peroxide or azo catalysts and water or organic liquid reaction media along with moderately high pressures, for example 5,000 to 15,000 p.s.i. Also, as is well known in the art, ethylene polymers of greater rigidity and higher density can be prepared at relatively low pressures, e.g., less than 1000 p.s.i. using organo-metallic and metal oxide-supported catalysts. The term "ethylene polymer" as used herein refers to all such ethylene polymers and is inclusive of homopolymer as well as copolymers; however, it will be understood that copolymers can be employed instead of homopolymers whenever reference is made to "polyethylene." Thus, it is not outside the scope of this invention to utilize a solid ethylene polymer which is a copolymer of ethylene and an ethylenically unsaturated comonomer employed in an amount preferably not to exceed 15 weight percent of the ethylene; for instance, styrene, vinyl acetate, vinyl chloride, vinylidene chlorofluoride, and methyl methacrylate.

The chlorosulfonated ethylene polymers incorporated in the ternary blends of this invention are well known to those skilled in the art. For example, certain commercial products sold under the trade name of "Hypalon" are chlorosulfonated polyethylenes. Chlorosulfonated polyethylenes are made by chlorination and sulfonation of normally solid high molecular weight polymers of ethylene, such as any of those discussed above. The chlorosulfonation can be effected in a number of different ways and one very suitable method producing a preferred type of chlorosulfonated polyethylene is described in U.S. Patent 2,586,363. As disclosed therein, polyethylene is chlorosulfonated to form a polymer having a preferred chlorine content of about 25 to 37% by weight and a preferred sulfur content of from 0.4 to 3% by weight. One very suitable chlorosulfonated polyethylene for use in this invention contains about 27.5 weight percent chlorine and about 1.5 weight percent sulfur. The chlorine and sulfur atoms are believed to be chemically combined with the hydrocarbon chain of the polymer with most of the chlorine substituted on the chain and the sulfur combined with the chain as $—SO_2Cl$ groups. This material contains about one chlorine atom for every 6 to 7 carbon atoms and one $—SO_2Cl$ group for every 90 to 130 carbon atoms. In the preparation of chlorosulfonated polyethylyene, the chlorosulfonation can be effected by reacting a polyethylene with chlorine and sulfur dioxide, with $SO_2Cl_2$ or with $SO_2Cl_2$ plus chlorine. Other procedures for making chlorosulfonated polyethylenes are described in the prior art, for example, in U.S. Patents 2,212,786 and 2,405,971.

Preferably, the chlorosulfonated polyethylenes employed in the ternary blends of this invention have a chlorine content of from 10 to 50 weight percent and a sulfur content of from 0.2 to 10 weight percent.

The polymers of styrene used in the ternary blends of this invention include homopolymers as well as copolymers of styrene and, therefore, it will be understood that the term "styrene polymer" is inclusive of both; however, it will also be understood that copolymers can be employed instead of homopolymers whenever reference is made to "polystyrene." Although this invention is directed particularly to the homopolymers of styrene, it is permissible to use styrene polymers containing polymerizable unsaturated comonomers preferably not exceeding 15 weight percent of the total styrene plus comonomer, such as, for example, α-methylstyrene, vinyltoluene, acrylonitrile, ethylacrylate, butylacrylate, methylmethacrylate, and the like. For most satisfactory blends, the styrene polymers should have been produced as a result of a high degree of conversion of the styrene measured by an alcohol soluble content of less than 5 weight percent, and be a high molecular weight polymer having a molecular weight of between 50,000 to 100,000 on the Staudinger scale, although somewhat lower or higher molecular weights, for instance within the range of 30,000 to 150,000 are permissible.

The polymers of styrene employed in the ternary blends of this invention can be produced in a large variety of methods either prior to the actual blending with the other addends or after admixture with the other addends followed by subsequent polymerization. The polymerization can be carried out in the presence of or in the absence of added catalyst and can be effected at atmospheric or superatmospheric pressures or in some instances at subatmospheric pressures. Any of the well known styrene polymerization catalysts, such as organic peroxides, inorganic peroxides, organic hydroperoxides, azo compounds and the like can be used to effect the polymerization. Those skilled in the art are fully familiar with various catalysts which can be used. By way of example, suitable peroxide type catalysts include: benzoyl peroxide, ditertiary butyl peroxide, tertiary butyl hydroperoxide, diacetyl peroxide, diethyl peroxycarbonate, and dimethylphenyl hydroperoxide. Some examples of inorganic peroxides include hydrogen peroxide, potassium persulfate, perborates and similar type compounds. By way of example of suitable azo type catalysts can be mentioned α,α'-azodiisobutyronitrile, p-bromobenzenediazonium fluoborate, azomethane, phenyldiazonium halides, diazoaminobenzene, p-bromobenzenediazonium hydroxide, and p-tolyldiazoaminobenzene. These various catalysts are used in small but catalytic amounts which are generally not in excess of 1% by weight based upon the monomeric material.

The styrene polymerization can be effected in accordance with the present invention in either mass, suspension or emulsion polymerization systems. In mass polymerization, the reaction mixture consists of the monomer with any catalyst used plus added polyethylene and/or chlorosulfonated polyethylene if either or both are to be incorporated during the polymerization, and no added solvent or other reaction medium is present. For suspension polymerization, a reaction medium such as water is used with a small amount of a suspending agent, for example, tricalcium phosphate, to give a suspension of particles of the initial reaction mixture, which particles grow in size as the polymerization proceeds, yet are not such a small size as to result in a permanently stable latex. To effect the emulsion polymerization, a sufficient amount of emulsifying agent, for example, a water soluble salt of a sulfonated long chain alkyl aromatic compound plus a suitable water soluble catalyst, such as potassium persulfate, is employed in suitable quantity along with vigorous agitation whereby an emulsion of the reactants in water is formed and the product is obtained in the form of a latex. The latex can then be coagulated if desired by known methods and the polymer separated from the water. The presence of dissolved polyethylene in the styrene monomer makes it more difficult to form an emulsion than in the absence of polyethylene; however, the emulsion technique has certain advantages in that a very high degree of conversion is attained. Conventional recipes and procedures for effecting mass, suspension and emulsion polymerization are so well known to those skilled in the art that they are not stated here.

It is also within the scope of this invention to incorporate a small amount of a high molecular weight mineral oil in the ternary blends formed to further improve the properties of the product, particularly the tensile elongation and flexural deflection. Ordinarily, the amount of mineral oil thus incorporated would be in the range of from 0.5 to 5 weight percent based on the final product. The use of an amount of mineral oil much greater than about 5% by weight is undesirable since it has an adverse effect on the heat distortion or softening temperature of the ternary blend. The mineral oil can be incorporated along with the chlorosulfonated polyethylene and/or polyethylene in the styrene monomer before the admixture is subjected to polymerization. However, the mineral oil can also be incorporated mechanically after polymerization of the styrene monomer either separately or in admixture with either or both of the polyethylene and chlorosulfonated polyethylene addends. The mineral oil employed should be principally aliphatic hydrocarbon in character and preferably at least 80% should have a boiling point of at least 300° C. corrected to atmospheric pressure. The mineral oil should have a relatively high molecular weight because the incorporation of considerable quantities of low molecular weight material tends to affect the physical properties of the finished product adversely. Suitable mineral oils commercially available for use in this invention include, for example, those sold under the trade names "Nujol" and "Fractol"; however, other mineral oils of equivalent composition and molecular weight can also be used.

It is not completely known how the advantages of the present invention are obtained by the formation of a ternary styrene polymer blend of improved physical properties; however, it is thought that the product made by polymerizing styrene monomer containing polyethylene and chlorosulfonated polyethylene addends involves a certain amount of interpolymerization between the polyethylene and the chlorosulfonated polyethylene molecules with the styrene molecules so as to result in the formation of what may be called a "graft" copolymer. It is by no means certain and it is even doubtful that all of the molecules of polyethylene and chlorosulfonated polyethylene become united with one or more styrene monomer units. It is also possible that a certain amount of splitting off of sulfonyl chloride or other chlorine and/or sulfur- and oxygen-containing groups from the chlorosulfonated polyethylene occurs leaving residual unsaturation capable of combining with styrene in a polymerization reaction. Other theories are also possible, as will be appreciated by those skilled in the art.

The physical properties of the ternary blend produced in this invention depend, to some extent, on the method by which the blend was formed, as well as upon the low concentration of addends incorporated in the styrene polymer and the ratio of said addends. In general, mechanical blends of styrene-polyethylene-chlorosulfonated polyethylene are substantially improved in notched impact strength and tensile elongation as compared with binary blends or unblended styrene polymers. These improvements in mechanical blends are obtained without substantial adverse affect on the other properties of the blend. Further, these improvements are obtained in mechanical blends with various ratios of polyethylene to chlorosulfonated polyethylene; that is, polyethylene and chlorosulfonated polyethylene can be used in excess of each other. Polymerization blends of styrene-polyethylene-chlorosulfonated polyethylene produced according to this invention are substantially improved in tensile strength and flexural strength at all ratios of polyethylene and chlorosulfonated polyethylene, as compared to unblended styrene polymer and polystyrene-polyethylene blends. The notched impact strengths of the ternary blends produced by polymerization are approximately equal to or somewhat less than the notched impact strength of the styrene-polyethylene blends, but substantially greater than the notched impact strength of styrene-chlorosulfonated polyethylene blends. However, the ternary blends wherein the polyethylene is in excess to the chlorosulfonated polyethylene have substantially equal or slightly better notched impact strengths than the styrene-polyethylene blends produced by polymerization methods. The ternary blends produced by polymerization are also characterized by substantial improvements in tensile strength and flexural strength as compared to styrene-polyethylene blends. Other improvements in the physical properties of the ternary blends of this invention are illustrated in the examples which follow.

EXAMPLE 1

Styrene polymer binary and ternary blends containing varying proportions of addends were prepared mechanically by milling the various mixtures on 3 x 8 inch Thropp mill rolls at 174° C. The polystyrene was first placed on the rolls and after a smooth rolling bank had formed in the nip of the rolls, the blend components were added and thoroughly homogenized by intensive hot milling for five minutes or until adequate dispersion was obtained. The blends were sheeted and stripped from the mill rolls. After sufficient cooling, the sheets were cut into 1 to 2 inch squares for convenient feeding into an Abbe grinder. The blend was ground into pellet size for injection molding on a one-ounce Watson-Stillman machine. The physical properties of the blends were then determined on the injection molded samples and are reported in Table I. These physical properties were determined according to the standard ASTM procedures; more specifically, tensile strength and elongation were determined according to ASTM D882–46, flexural strength and deflection were determined according to ASTM D790–49T and notched impact strength was determined by the Izod method as set forth in ASTM D256–47T.

*Table I*

PHYSICAL PROPERTIES OF STYRENE-ETHYLENE POLYMER-CHLOROSULFONATED ETHYLENE POLYMER MECHANICAL POLYBLENDS

| Composition, percent | | | Tensile properties | | Flexural properties | | Notched impact strength, ft.-lbs. |
|---|---|---|---|---|---|---|---|
| Polystyrene | Polyethylene | Chlorosulfonated polyethylene | Strength at break, p.s.i. | Elongation at break, percent | Strength, p.s.i. (at yield) | Deflection, inches (at yield) | |
| 97.5 | 1.9 | 0.6 | 7,695 | 5.0 | 15,562 | 0.17 | 1.2 |
| 97.5 | 0.6 | 1.9 | 7,594 | 5.0 | 15,165 | 0.26 | 1.5 |
| 97.5 | 1.2 | 1.3 | 8,030 | 5.0 | 15,986 | 0.41 | 1.4 |
| 97.5 | 2.5 | ------- | 8,485 | 3.2 | 15,988 | 0.31 | 0.47 |
| 95.0 | 1.0 | 4.0 | 7,458 | 5.0 | 15,419 | 0.29 | 0.92 |
| 95.0 | 4.0 | 1.0 | 8,262 | 5.0 | 15,030 | 0.18 | 0.87 |
| 95.0 | 2.5 | 2.5 | 7,021 | 5.0 | 13,975 | 0.17 | 1.2 |
| 95.0 | 5.0 | ------- | 8,152 | 3.5 | 16,220 | 0.26 | 0.36 |

EXAMPLE 2

Binary and ternary blends of various concentrations of addends were prepared by a polymerization method wherein the desired amount of polyethylene and/or chlorosulfonated polyethylene were incorporated in styrene monomer, which was then polymerized. The polymerization of the styrene monomer and appropriate addends was conducted in Pyrex glass tubes in the absence of catalyst. The glass tubes were thoroughly cleaned, filled with monomer and addends, purged with nitrogen, and then sealed with a small oxygen gas hand torch. The tubes were then heated for 24 hours at 98° C., followed by 24 hours at 120° C., followed by 8 hours at 180° C. After completion of the heating step, the polymer was removed from the glass tubes and milled for 5 minutes at 174° C. on 3" x 8" Thropp mill rolls. The sheets formed on the mill rolls were removed therefrom, cooled and cut into 1 to 2 inch squares for feeding into the Abbe grinder to form particles of approximately 3/16-inch pellet size. The test specimens were prepared by injection molding on a one-ounce Watson-Stillman machine operated at a temperature of 165° C. The physical properties of the blends were determined according to the ASTM standards, as set forth above, and are reported in Table II.

*Table II*

PHYSICAL PROPERTIES OF STYRENE-ETHYLENE POLYMER-CHLOROSULFONATED ETHYLENE POLYMER POLYMERIZATION POLYBLENDS

| Composition, percent | | | Tensile properties | | Flexural properties | | Notched impact strength, ft.-lbs. |
|---|---|---|---|---|---|---|---|
| Polystyrene | Polyethylene | Chlorosulfonated polyethylene | Strength at break, p.s.i. | Elongation at break, percent | Strength, p.s.i. (at yield) | Deflection, inches (at yield) | |
| 97.5 | 1.2 | 1.3 | 9,198 | 6.5 | 16,750 | 0.43 | 1.2 |
| 97.5 | 0.6 | 0.9 | 9,105 | 7.2 | 16,676 | 0.19 | 1.0 |
| 97.5 | 1.9 | 0.6 | 8,191 | 5.0 | 13,407 | 0.28 | 2.0 |
| 97.5 | 2.5 | ------- | 6,615 | 5.0 | 12,498 | 0.18 | 1.4 |
| 97.5 | ----- | 2.5 | 8,562 | 8.1 | 17,294 | 0.20 | 0.84 |
| 95.0 | 4.0 | 1.0 | 6,966 | 5.0 | 13,402 | 0.19 | 1.1 |
| 95.0 | 1.0 | 4.0 | 8,726 | 5.0 | 16,496 | 0.19 | 0.45 |
| 95.0 | 2.5 | 2.5 | 8,487 | 5.0 | 16,628 | 0.20 | 0.46 |
| 95.0 | 5.0 | ------- | 6,489 | 5.0 | 12,100 | 0.19 | 1.4 |
| 95.0 | ----- | 5.0 | 8,576 | 5.0 | 16,117 | 0.19 | 0.38 |

The ternary blends of this invention are useful in making injection molded and compression molded articles, and can also be used in other forms, for example, as films, surface coatings, and monofilaments. They can also be mixed with other materials such as pigments, plasticizers, natural and synthetic resins, fillers and the like, according to procedures well known to those skilled in the art.

Reasonable variation and modification are possible within the scope of the foregoing disclosure and the appended claims, the essence of which is that there have been provided ternary blend compositions of styrene polymers comprising a major amount of styrene polymer and a minor amount of both ethylene polymer and chlorosulfonated ethylene polymer addends, having improved physical properties over the corresponding binary blends, and mechanical and polymerization methods for preparing the same.

We claim:

1. Styrene polymer product containing a major proportion of styrene polymer and a minor proportion of ethylene polymer and chlorosulfonated polyethylene which together constitute from 1 to 30 weight percent based on total product, said styrene polymer being a normally solid high molecular weight polymer selected from the group consisting of styrene homopolymer and styrene copolymers containing at least 85 weight percent styrene and a comonomer selected from the group consisting of alpha-methylstyrene, vinyltoluene, acrylonitrile, ethyl acrylate, butyl acrylate, and methyl methacrylate, wherein said ethylene polymer is a normally solid, high molecular weight polymer selected from the group consisting of ethylene homopolymer and ethylene copolymers containing at least 85 weight percent ethylene and a comonomer selected from the group consisting of styrene, vinyl acetate, vinyl chloride, vinylidene chlorofluoride, and methyl methacrylate, and said chlorosulfonated polyethylene being prepared from polyethylene having a molecular weight of at least 6,000 prior to chlorosulfonation.

2. The product of claim 1, wherein said styrene polymer is styrene homopolymer and said ethylene polymer is ethylene homopolymer.

3. The product of claim 1, wherein said chlorosulfonated polyethylene is chlorosulfonated polyethylene having a chlorine content of 10–50 weight percent and a sulfur content of 0.2–10 weight percent.

4. Styrene polymer product containing a major proportion of styrene polymer and a minor proportion of ethylene polymer and chlorosulfonated polyethylene which together constitute from 1 to 10 weight percent based on total product, said styrene polymer being a normally solid, high molecular weight polymer selected from the group consisting of styrene homopolymer and styrene copolymers containing at least 85 weight percent styrene and a comonomer selected from the group consisting of alpha-methylstyrene, vinyltoluene, acrylonitrile, ethyl acrylate, butyl acrylate, and methyl methacrylate, wherein said ethylene polymer is a normally solid, high molecular weight polymer selected from the group consisting of polyethylene and ethylene copolymers containing at least 85 weight percent ethylene and a comonomer selected from the group consisting of styrene, vinyl acetate, vinyl chloride, vinylidene chlorofluoride, and methyl methacrylate, and said chlorosulfonated polyethylene being prepared from polyethylene having a molecular weight of at least 6,000 prior to chlorosulfonation.

5. A product of claim 4, wherein said ethylene polymer and said chlorosulfonated polyethylene are present in substantially equal amounts.

6. A product of claim 4, wherein said ethylene polymer is present in an amount greater than the amount of chlorosulfonated polyethylene.

7. A method for preparing a ternary blend of styrene polymer, ethylene polymer and chlorosulfonated polyethylene, said method comprising forming an intimate mixture of 70 to 99 parts by weight of a normally solid, high molecular weight styrene polymer selected from the group consisting of styrene homopolymer and styrene copolymers containing at least 85 weight percent styrene, and a comonomer selected from the group consisting of α-methylstyrene, vinyltoluene, acrylonitrile, ethyl acrylate, butyl acrylate, and methyl methacrylate, with 1 to 30 parts by weight of a solid, high molecular weight ethylene polymer selected from the group consisting of ethylene homopolymer and ethylene copolymers containing at least 85 weight percent ethylene, and a comonomer selected from the group consisting of styrene, vinyl acetate, vinyl chloride, vinylidene chlorofluoride, and methyl methacrylate, and a chlorosulfonated polyethylene having a chlorine content of 10 to 50 weight percent and a sulfur content of 0.2 to 10 weight percent, the combined amounts of said ethylene polymer and said chlorosulfonated polyethylene being less than 30 parts by weight.

8. A method of claim 7, wherein said ternary blend is made by mechanically admixing said styrene polymer, said ethylene polymer and said chlorosulfonated polyethylene in preformed states.

9. A method for improving a styrene polymer to obtain a ternary blend having improved physical properties, said method comprising mechanically admixing a styrene polymer with an ethylene polymer and a chlorosulfonated polyethylene in preformed states as normally solid, high molecular weight polymers, said ethylene polymer and said chlorosulfonated polyethylene taken together constituting from 1 to 30 percent by weight of the final blend.

10. A method for improving a styrene polymer to obtain a ternary blend having improved physical properties, said method comprising polymerizing a polymerizable, unsaturated, monomeric material composed of at least 85 percent styrene containing preformed ethylene polymer and mechanically admixing the resulting polymerizate with chlorosulfonated polyethylene, said ethylene polymer and said chlorosulfonated polyethylene taken together constituting from 1 to 30 percent by weight of the final blend.

11. A method for improving a styrene polymer to obtain a ternary blend having improved physical properties, said method comprising polymerizing a polymerizable, unsaturated, monomeric material composed of at least 85 percent styrene containing preformed chlorosulfonated polyethylene and mechanically admixing the resulting polymerizate with preformed ethylene polymer, said ethylene polymer and said chlorosulfonated polyethylene taken together constituting from 1 to 30 percent by weight of the final blend.

12. Styrene polymer product containing a major proportion of styrene polymer and a minor proportion of polyethylene and chlorosulfonated polyethylene which together constitute from 1 to 10 weight percent based on total product, said styrene polymer being a normally solid, high molecular weight, styrene homopolymer, and said chlorosulfonated polyethylene being prepared from polyethylene having a molecular weight of at least 6,000 prior to chlorosulfonation.

References Cited in the file of this patent

UNITED STATES PATENTS

| | | |
|---|---|---|
| 2,729,608 | Strain | Jan. 3, 1956 |
| 2,834,746 | Salyer et al. | May 13, 1958 |
| 2,834,749 | Salyer et al. | May 13, 1958 |
| 2,854,425 | Boger et al. | Sept. 30, 1958 |
| 2,888,424 | Precopio et al. | May 26, 1959 |